3,025,282
PROCESS FOR POLYMERIZATION OF
VINYL ETHERS
Donald L. Christman and Edwin J. Vandenberg, Wilmington, Del., assignors to Hercules Powder Company, Wilmington, Del., a corporation of Delaware
No Drawing. Filed Sept. 14, 1959, Ser. No. 839,544
15 Claims. (Cl. 260—91.1)

This invention relates to a new process of polymerizing vinyl and other unsaturated ethers whereby polyethers of high molecular weight are obtained and which frequently have a high degree of crystallinity.

It is well known that vinyl ethers may be polymerized in bulk or solution with Friedel-Crafts catalysts to yield polymers that vary from viscous liquid to balsam-like or soft resinous-like polymers. Under certain conditions and using boron trifluoride-etherates as catalysts it has been possible to produce a crystalline type of poly(vinyl methyl ether) and poly-vinyl isobutyl ether). While a rubbery poly(vinyl ethyl ether) has been produced, it was not crystalline. In the case of both the balsam-like and crystalline-type poly(vinyl methyl ether) of the prior art, the polymer is completely soluble in cold water and in organic solvents such as methanol, ethanol, acetone and benzene. Because of the extreme solubility of these prior art vinyl ether polymers, their utility has been considerably limited.

Now in accordance with this invention, it has been found that vinyl and other ethylenically unsaturated ethers may be polymerized with the catalyst formed by mixing sulfuric acid with a metal compound having the general formula:

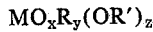

where M is a metal selected from groups III–A, IV–A, IV–B, V–B, VI–B and VIII of the periodic table, R is hydrogen, alkyl, cycloalkyl, aralkyl, or aryl, R' is alkyl, cycloalkyl, aralkyl or aryl, x may be 0 to 2, and when x is 0, the sum of y and z is equal to n, the valence of the metal, and y may be 0 to n and z may be 0 to n, when x is 1, the sum of y and z is equal to (n−2), and y may be 0 to (n−2) and z may be 0 to (n−2), and when x is 2, the sum of y and z is equal to (n−4), and y may be 0 to (n−4) and z may be 0 to (n−4). By means of this process it is possible to polymerize vinyl ethers to high molecular weight polymers in high yields which polymers are in many cases, as for example, the homopolymers of the lower alkyl vinyl ethers, highly crystalline polymers of unique solubility characteristics.

The periodic table used in the specification and appended claims for designating the groups and subgroups of the periodic table is that given in Lange's Handbook of Chemistry, published by Handbook Publishers, Inc., Sandusky, Ohio, on pages 56–57 of the 8th edition (1952).

The exact nature of the active catalytic species formed by reacting these metal compounds with sulfuric acid is not known, but it appears to be a complex organic metallic sulfate. At any rate an entirely different effect is obtained than when the metal alkyl, metal alkoxide, etc. or sulfuric acid is used alone or when the corresponding metal sulfate is used as the catalyst.

Any metal compound, of the above specified metals, that has the above formula may be reacted with sulfuric acid to produce the catalyst used in accordance with the invention. Exemplary of these metal compounds are organometallic compounds wherein there are attached to the metal only hydrogen or hydrocarbon radicals as for example aluminum trihydrocarbons, aluminum dihydrocarbon hydrides, etc., such as trimethylaluminum, triethylaluminum, diethylaluminum hydride, tripropylaluminum, triisopropylaluminum, triisobutylaluminum, diisobutylaluminum hydride, tri(n-hexyl)-aluminum, trioctylaluminum, tri(cyclohexyl)aluminum, triphenylaluminum, etc., the corresponding gallium and indium compounds, tin tetraalkyls, etc. Another group of metal compounds are the metal alkoxides, as for example aluminum methoxide, ethoxide, propoxide, isopropoxide, butoxide, phenoxide, benzyl oxide, acetylacetonate, 2-methoxyethoxide, 2-ethoxyethoxide, etc., the mixed aluminum alkyl alkoxides, titanium alkoxides and acetylacetonates, vanadium alkoxides, vanadyl esters such as ethyl vanadate, vanadium acetylacetonate, ferric alkoxides, ferric acetylacetonate, chromium esters such as tert-butyl chromate, chromium acetylacetonate, stannate esters, zirconium alkoxides, etc.

The reaction of the metal compound with sulfuric acid may be carried out in a variety of ways. The two reactants may be simply mixed, but generally the reaction is carried out in the presence of an anhydrous, inert organic diluent, which may or may not be a solvent for one or both reactants or the product. Exemplary of the diluents that may be used are hydrocarbons such as hexane, heptane, cyclohexane, benzene, toluene, xylene, etc., and mixtures of hydrocarbons, chlorinated hydrocarbons such as methylene chloride, ethylene dichloride, chlorobenzene, esters such as ethyl acetate, ethers such as diethyl ether, etc. The amount of time required for the reaction will vary from a few minutes to many hours depending upon the reactivity of the metal compound. The mole ratio of the sulfuric acid to the metal compound may be varied widely, but generally will be from about 1:100 to about 2:1 and preferably will be from about 1:50 to about 1:2.

The sulfuric acid may be used as the 100% acid or it may be used as a solution, of any concentration, in an anhydrous organic diluent. The activity of the catalyst may be further enhanced by heat-treating the catalyst mixture as for example by heating at about 60° C. to about 100° C. for an hour or more. The amount of the catalyst used for the polymerization will vary from at least a catalytic amount to any desired amount but generally will be within the range of from about 0.0001 mole to about 0.05 mole of metal per mole of monomer.

Any vinyl, propenyl, isopropenyl or butadienyl ether may be polymerized with the catalysts of this invention, as for example, vinyl alkyl ethers, vinyl cycloalkyl ethers, vinyl aralkyl ethers or vinyl aryl ethers, and the corresponding propenyl and isopropenyl ethers, alkyl butadienyl ethers, etc. Exemplary of these ethers that may be so polymerized are the vinyl alkyl ethers such as vinyl methyl ether, vinyl ethyl ether, vinyl 2-chloroethyl ether, vinyl 2-methoxyethyl ether, vinyl 2-cyanoethyl ether, vinyl trifluoroethyl ether, vinyl propyl ether, vinyl isopropyl ether, vinyl n-butyl ether, vinyl isobutyl ether, vinyl tert-butyl ether, vinyl neopentyl ether, vinyl n-hexyl ether, vinyl 2-ethylhexyl ether, vinyl stearyl ether, etc., vinyl allyl ether, the vinyl cycloalkyl ethers such as vinyl cyclohexyl ether, vinyl α-terpinyl ether, vinyl isobornyl ether, etc., the vinyl aralkyl ethers such as vinyl benzyl ether, vinyl p-chlorobenzyl ether, vinyl α,α-dimethylbenzyl ether, etc., and the vinyl aryl ethers such as vinyl phenyl ether, vinyl p-methylphenyl ether, vinyl p-chlorophenyl ether, vinyl α-naphthyl ether, etc., and the corresponding propenyl and isopropenyl ethers, butadienyl methyl ether (1-methoxybutadiene), etc. Any mixture of these vinyl ethers may likewise be polymerized.

The polymerization of vinyl ethers in accordance with this invention may be carried out in a wide variety of ways. The process may be a batch or continuous operation and may be carried out with or without the use of an inert organic diluent as the reaction medium. The catalyst may be added all at one time or in increments or continuously during the polymerization. Any inert liquid organic diluent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated hydrocarbons such as ethyl chloride, methyl chloride, methylene chloride, ethylene chloride, chloroform, chlorobenzene, etc., aliphatic ethers, cycloaliphatic ethers, aromatic ethers, and cyclic ethers, as for example, diethyl ether, dioxane, tetrahydrofuran, etc., and esters, as for example, ethyl acetate, etc. The polymerization should be carried out in the substantial absence of water and preferably alcohols and other active-hydrogen-containing compounds which may be present in the reactants should be kept at a low level since they tend to inactivate the catalyst.

The selection of the temperature and pressure used for the polymerization process will depend upon the activity of the catalyst system being used, the diluent used, etc. In general, the polymerization will be carried out at a temperature within the range of from about −100° C. to about 200° C. and preferably from about −50° C. to about 100° C. In the same way, while atmospheric pressure or a pressure of only a few pounds may be used, the polymerization may be carried out under a wide range of pressures, as for example, from a partial vacuum to about 1000 pounds and preferably from about atmospheric to about 500 pounds pressure. Higher pressures may, of course, be used, but generally do not appreciably alter the course of the polymerization.

While these metal compound-sulfuric acid catalysts are highly effective for the polymerization of vinyl ethers, their catalytic activity is even further enhanced by the addition of an activator. Compounds which are effective activators for this polymerization process are the metal alkoxides, which may be an alkoxide of the same metal as the metal compound used in the preparation of the catalyst or of one of the other metals of the above mentioned groups, particularly outstanding results being obtained with aluminum alkoxides having the formula Al(OR)$_3$ where R is a lower alkyl radical, as for example, aluminum isopropoxide. Another very effective class of activators are the trialkylaluminums, as for example, triethylaluminum, triisobutylaluminum, etc. The trialkylaluminum may be used as such or it may be reacted with a complexing agent prior to its use as an activator in the polymerization process. Just what may be the function of the complexing agent is not completely understood, but it is believed that it forms a complex with the organometallic compound to prevent any undesirable side reactions which might otherwise take place between the organometallic compound and the monomer or polymer. Any compound that will form a loose type of complex (possibly functioning as an electron donor) with the trialkylaluminum may be used, as for example, ethers, esters, ketones, etc., such as diethyl ether, tetrahydrofuran, ethyl acetate, etc. Also useful as activators are the alkylaluminum alkoxides. Just how these so-called "activators" act is not known. In some cases they undoubtedly inactivate deleterious impurities such as water, excessive amounts of alcohol, etc. At any rate improved results, generally in the yield of crystalline polymer, are obtained. When an activator is used, it is preferably added to the vinyl ether polymerization reaction mixture prior to the addition of the catalyst or it may be added to the catalyst mixture, or to both. The amount of activator added may be varied widely, but generally will be from about 0.001 mole to about 0.5 mole per mole of monomer and usually will be from about 0.005 mole to about 0.05 mole.

The following examples will illustrate the process of polymerizing vinyl ethers in accordance with this invention. The molecular weight of the polymers produced in these examples is indicated by the reduced specific viscosity (RSV) given for each. By the term "reduced specific viscosity" is meant the $\eta$sp/c determined on an 0.1% solution (0.1 g. of the polymer per 100 ml. of solution) of the polymer in the indicated solvent at the indicated temperature. Where the melting point is given it is the temperature at which birefringence due to crystallinity disappears. All parts and percentages are by weight unless otherwise indicated.

EXAMPLES 1–12

The catalysts used in these examples were prepared by mixing, under nitrogen, a solution of the specified metal alkyl or alkoxide in heptane with a given amount of 100% sulfuric acid in Examples 1, 2, 4–6, 8 and 9–12, an 0.23 M solution of sulfuric acid in ether in Example 3 and an 0.68 M solution of sulfuric acid in ether in Example 7, and shaking the mixture with glass beads at room temperature for 1–16 hours. In Examples 3, 8 and 9 there was also added a volume of anhydrous ether equal to the volume of heptane. In Table I is set forth the metal alkyl or alkoxide used in the catalyst preparation for each example along with the amount thereof and the molar ratio of the metal compound to sulfuric acid used in the catalyst preparation.

In each polymerization, a vessel with a nitrogen atmosphere was charged with the specified amount of methyl vinyl ether (MVE), the diluent, and activator, except for Examples 4, 6 and 8 where no activator was added. In Examples 7 and 11 the triisobutylaluminum used as the activator was added as its molar complex with tetrahydrofuran. The reaction mixture was then adjusted to the polymerization temperature and the catalyst prepared as described above was added (in increments in Examples 4 and 5). After the specified reaction time, the catalyst was inactivated by the addition of 4 parts of a 1 M solution of ammonia in ethanol and the diluents were removed under vacuum. The crude polymer remaining was extracted several times with methanol (Examples 1–7 and 10–12) and ethanol (Examples 8 and 9). In Table I is set forth the diluent and amount thereof used in the polymerization, the amount of methyl vinyl ether, activator and amount thereof and the reaction time and temperature, along with the physical properties of the crystalline polymer isolated. The RSV is that measured on an 0.1% solution in chloroform at 25° C. and the crystallinity is indicated as moderate, high, etc. by X-ray and/or as percent determined by infrared (IR).

Table I

| Ex. | Catalyst prepared from— Metal compound | Parts | Molar ratio M.C.[a] to $H_2SO_4$ | Diluent | Parts | MVE parts | Activator | Parts | Reaction temp. and time | Crystalline polymer isolated RSV | Crystallinity | Percent yield |
|---|---|---|---|---|---|---|---|---|---|---|---|---|
| 1 | Al(Oi—$C_3H_7$)$_3$ | 0.190 | 4:1 | Ether | 16 | 5.6 | Al(i—$C_4H_9$)$_3$ | 0.198 | 0° C. 5 hrs., 30° C. 16 hrs. | 1.45 | 47% by IR high X-ray | 40 |
| 2 | Al(Oi—$C_3H_7$)$_3$ | 0.408 | 75:1 | $CH_2Cl_2$ | 65 | 7.5 | Al(Oi—$C_3H_7$)$_3$ | 0.204 | 0° C. 18 hrs | 10.3 | 35% by IR | 92 |
| 3 | $VOA_2$[b] | 0.212 | 2:1 | $CH_2Cl_2$ | 65 | 7.5 | Al(Oi—$C_3H_7$)$_3$ | 0.245 | 0° C. 4 hrs., 30° C. 16 hrs. | 1.78 | 54% by IR | |
| 4 | Al(Oi—$C_3H_7$)$_3$ | 0.110 | 4:1 | $CH_2Cl_2$ | 94 | 7.5 | | | 0° C. 5 hrs | 4.47 | High X-ray | 65 |
| 5 | Al(Oi—$C_3H_7$)$_3$ | 0.110 | 4:1 | $CH_2Cl_2$ | 94 | 7.5 | Al(Oi—$C_3H_7$)$_3$ | 2.55 | ___do___ | 8.35 | ___do___ | 68 |
| 6 | Ti(Oi—$C_3H_7$)$_4$ | 0.028 | 4:1 | Ether | 35 | 7.5 | | | 0° C. 22 hrs | 0.8 | 22% by IR | |
| 7 | Al($C_2H_5$)$_3$ | 0.114 | 1.5:1 | ___do___ | 16 | 7.5 | Al(i—$C_4H_9$)$_3$ THF | 0.198 | 0° C. 20 hrs | 4.92 | Mod. X-ray | |
| 8 | Al(i—$C_4H_9$)$_3$ | 0.198 | 4:1 | ___do___ | 16 | 7.5 | | | 30° C. 20 hrs | 1.97 | High X-ray | |
| 9 | Al($C_2H_5$)$_3$ | 0.160 | 5.9:1 | $CH_2Cl_2$ | 30 | 7.5 | Al(Oi—$C_3H_7$)$_3$ | 0.204 | 0° C. 4 hrs., 30° C. 16 hrs. | 7.77 | 27% IR high X-ray. | 55 |
| 10 | $CrA_3$[b] | 0.349 | 2:1 | $CH_2Cl_2$ | 65 | 10 | ___do___ | 0.408 | ___do___ | 1.18 | 48% IR | |
| 11 | ($C_2H_5$)$_2$AlA[b] | 0.184 | 5:1 | Ethyl acetate. | 45 | 10 | Al(i—$C_4H_9$)$_3$ THF | 0.198 | ___do___ | 13.4 | | |
| 12 | Sn($C_2H_5$)$_4$ | 0.235 | 2:1 | $CH_2Cl_2$ | 65 | 10 | Al(Oi—$C_3H_7$)$_3$ | 0.408 | ___do___ | 1.56 | 43% IR | |

[a] M.C.=Metal compound.    [b] A=Acetylacetonate.

EXAMPLES 13–16

In these examples isopropyl vinyl ether was polymerized following the procedure described for Examples 1–12, except that in Example 15 the catalyst was added in increments (8 portions at two-minute intervals and 4 portions at five-minute intervals). The amount of isopropyl vinyl ether (IVE) polymerized, diluent, total amount of catalyst and the activator added are set forth in Table II along with the reaction time and temperature.

After the catalyst was inactivated and the diluents removed, the crude polymer was extracted in each case with hexane. The hexane-insoluble poly(vinyl isopropyl ether) obtained in each case was also insoluble in methanol and was shown to be highly crystalline by X-ray. In Table II is set forth the data on the isolated polymer, the RSV being determined on an 0.1% solution in chloroform at 25° C.

EXAMPLES 17–30

In these examples various unsaturated alkyl ethers were polymerized using the general technique for catalyst preparation and for polymerization as described in Examples 1 to 12. The ether polymerized catalyst, diluent activator (if any) used and the amount of each and reaction time and temperature are tabulated in Table III.

In each case the crude polymer obtained after removal of the diluents was extracted with the specified solvent to separate soluble and insoluble fractions of the polymer. In all cases except Examples 20 and 30, the insoluble polymer was highly crystalline and the soluble fraction was amorphous and/or of low crystallinity. In those two cases, both the soluble and insoluble polymers were amorphous. In Table III is set forth the RSV of the insoluble polymer isolated in each case.

The highly crystalline, ethanol-insoluble poly(vinyl n-propyl ether) isolated in Example 23 was further purified by dissolving it in hot acetone and allowed it to crystallize on cooling. It was a highly crystalline polymer which could be formed into a tough, flexible sheet. It is insoluble in hexane but is swollen by it.

Table II

| Ex. | Catalyst prepared from— Metal compound | Parts | Molar ratio M.C.[a] to $H_2SO_4$ | Diluent | Parts | IVE parts | Activator | Parts | Reaction temp. and time | Crystalline polymer isolated RSV | Crystallinity | Percent yield |
|---|---|---|---|---|---|---|---|---|---|---|---|---|
| 13 | Fe(O$C_2H_5$)$_3$ | 0.191 | 4.2:1 | Ethyl acetate. | 45 | 10 | Al(i—$C_4H_9$)$_3$ THF | 0.198 | 0°C. 3 hrs., 25°C. 16 hrs. | 7.27 | High X-ray | |
| 14 | Al(Oi—$C_3H_7$)$_3$ | 0.204 | 11:1 | ___do___ | 45 | 10 | ___do___ | 0.198 | 0°C. 3 hrs., 25°C. 16 hrs. | 16.7 | ___do___ | 40 |
| 15 | ___do___ | 0.694 | 4.6:1 | ___do___ | 45 | 10 | ___do___ | 0.198 | 0°C. 3 hrs., 25°C. 16 hrs. | [b]31.0 | ___do___ | 41 |
| 16 | Al(i—$C_4H_9$)$_3$ | 0.099 | 2.1:1 | Ether | 18 | 7.5 | Al(i—$C_4H_9$)$_3$ | 0.495 | 10°C. 1 hr., 25°C. 15 hrs. | | ___do___ | |

[a] M.C.=Metal compound.    [b] Melting Point 178° C.

Table III

| Ex. | Ether polymerized | Parts | Catalyst formed from— | | | Diluent | Parts | Activator | Parts | Reaction temp. and time | Insoluble[1] polymer isolated RSV[2] |
| --- | --- | --- | --- | --- | --- | --- | --- | --- | --- | --- | --- |
| | | | Metal compound | Parts | Molar ratio M.C. to $H_2SO_4$ | | | | | | |
| 17 | Vinyl ethyl | 6.0 | $Al(Oi-C_3H_7)_3$ | 0.245 | 1.8:1 | Ethyl acetate | 45 | $Al(i-C_4H_9)_3$ THF | 0.198 | 0°C. 3 hrs., 25°C. 16 hrs. | 5.0 |
| 18 | Vinyl n-butyl | 10 | $Al(Oi-C_3H_7)_3$ | 0.245 | 4:1 | ...do | 45 | $Al(i-C_4H_9)_3$ THF | 0.198 | −50°C. 5 hrs., 25°C. 16 hrs. | 5.2 |
| 19 | Vinyl i-butyl | 10 | $Al(Oi-C_3H_7)_3$ | 0.143 | 4:1 | ...do | 45 | $Al(i-C_4H_9)_3$ THF | 0.198 | 0°C. 2 hrs., 25°C. 16 hrs. | 1.8 |
| 20 | Vinyl 2-ethylhexyl | 2 | $Al(Oi-C_3H_7)_3$ | 0.012 | 4:1 | $CH_2Cl_2$ | 13 | $Al(Oi-C_3H_7)_3$ | 0.05 | 0°C. 2 hrs., 25°C. 16 hrs. | |
| 21 | Vinyl 2-chloroethyl | 10 | $Al(Oi-C_3H_7)_3$ | 0.06 | 4:1 | $CH_2Cl_2$ | 34 | $Al(Oi-C_3H_7)_3$ | 0.21 | 0°C. 2 hrs., 25°C. 16 hrs. | 1.4 |
| 22 | Vinyl benzyl | 9 | $Al(Oi-C_3H_7)_3$ | 0.06 | 4:1 | $CH_2Cl_2$ | 34 | $Al(Oi-C_3H_7)_3$ | 0.21 | 0°C. 2 hrs., 25°C. 16 hrs. | 0.75 |
| 23 | Vinyl n-propyl | 10 | $Al(Oi-C_3H_7)_3$ | 0.037 | 4:1 | Ethyl acetate | 45 | $Al(i-C_4H_9)_3$ THF | 0.198 | 0°C. 4 hrs., 25°C. 16 hrs. | 6.9 |
| 24 | Vinyl trifluoroethyl | 2.5 | $Al(Oi-C_3H_7)_3$ | 0.17 | 1:1 | $C_6H_5Cl$ | 11 | $Al(Oi-C_3H_7)_3$ | 0.043 | 0°C. 3 hrs., 25°C. 16 hrs. | 0.6 |
| 25 | Vinyl 2-methoxyethyl | 9 | $Al(Oi-C_3H_7)_3$ | 0.21 | 8:1 | Ethyl acetate | 45 | $Al(i-C_4H_9)_3$ THF | 0.198 | 0°C 2 hrs., 30°C. 16 hrs. | 2.06 |
| 26 | 1-methoxy butadiene | 1.5 | $Al(Oi-C_3H_7)_3$ | 0.03 | 4:1 | $CH_2Cl_2$ | 14 | $Al(Oi-C_3H_7)_3$ | 0.05 | 0°C. 2 hrs., 25°C. 18 hrs. | 2.64 |
| 27 | Vinyl tert-butyl | 7.5 | $Al(i-C_4H_9)_3$ | 0.099 | 2.1:1 | Ether | 18 | $Al(i-C_4H_9)_3$ | 0.049 | 10°C. 1 hr., 25°C. 15 hrs. | 0.63 |
| 28 | Propenyl methyl (70% cis) | 2.5 | $Al(Oi-C_3H_7)_3$ | 0.017 | 4:1 | $CH_2Cl_2$ | 14 | $Al(Oi-C_3H_7)_3$ | 0.20 | 0°C. 4 hrs., 25°C. 18 hrs. | 1.27 |
| 29 | cis-Propenyl ethyl | 2.3 | $Al(Oi-C_3H_7)_3$ | 0.017 | 5:1 | $C_6H_5Cl$ | 3.3 | $Al(Oi-C_3H_7)_3$ | 0.10 | 0°C. 3 hrs., 25°C. 16 hrs. | 3.4 |
| 30 | Isopropenyl ethyl | 2 | $Al(Oi-C_4H_7)_3$ | 0.212 | 4:1 | | | $Al(i-C_4H_9)_3$ THF | 0.05 | 0°C. 2 hrs., 25°C. 16 hrs. | 1.0 |

[1] Insoluble in:
Methanol (Examples 17, 24 and 26).
Hexane (Examples 18, 19 and 27).
Methyl ethyl ketone (Example 20).
Acetone (Examples 21, 22, 28 and 30).
Ethanol (Example 23).
Methylene chloride (Example 29).
Diethyl ether (Example 25).

[2] RSV determined in chloroform at 25°C. except for Example 24 done in acetone at 25°C. and Example 29 in toluene at 50°C.

EXAMPLE 31

The catalyst used in this example and the following two examples was prepared by mixing under nitrogen 48 ml. of an 0.85 M solution of aluminum isopropoxide in n-heptane with 0.48 ml. of 100% sulfuric acid. The mixture was shaken vigorously with glass beads for 1.5 hours and then left at room temperature overnight after which it was stored at −5° C. until used.

A polymerization vessel with a nitrogen atmosphere was charged with 69 parts of anhydrous methylene chloride, 3.75 parts of vinyl isopropyl ether and 5.35 parts of vinyl 2-chloroethyl ether. The reaction mixture was cooled to 0° C., agitated, and 0.21 part of aluminum isopropoxide was added in the form of an 0.85 M solution in n-heptane, followed by addition of an amount of the above catalyst mixture equivalent to 0.09 part of aluminum. After stirring for 2 hours at 0° C. and for 16 hours at 25° C., the catalyst was deactivated by adding 4 parts of a 1 M solution of ammonia in ethanol. Four parts of a 1% solution of 4,4′-thiobis(6-tert.-butyl-m-cresol) in ethanol was then added as a stabilizer for the polymer and the reaction solution was evaporated to dryness in vacuum. The crude polymer which remained as a residue was extracted with methanol, whereby low molecular weight oils were removed. The methanol-insoluble copolymer which remained as a residue amounted to a yield of 70% and had an RSV of 4.1 (0.1% solution in chloroform at 25° C.). A chlorine analysis of this copolymer showed it to contain 22.4% chlorine corresponding to 67.4 mole percent of vinyl 2-chloroethyl ether in the copolymer.

EXAMPLE 32

The above polymerization process was repeated using 3.75 parts of vinyl isopropyl ether and 3.75 parts of vinyl methyl ether as the monomers that were copolymerized. Isolation of the copolymer as described above gave an 84% yield of a methanol-soluble, nontacky rubber having an RSV of 5.9 (0.1% in chloroform at 25° C.) and a 37% yield of a methanol-insoluble, solid polymer having an RSV of 8.2 (0.1% in chloroform at 25° C.).

EXAMPLE 33

A polymerization vessel was charged with 1380 parts of anhydrous methylene chloride, was flushed with nitrogen, and then 2.95 parts of aluminum isopropoxide was added as an 0.72 M solution in n-heptane. The solution was stirred, cooled to 1° C., and 60 parts of vinyl allyl ether and 120 parts of vinyl methyl ether were added. With the temperature held at 1° C. an amount of the catalyst prepared as described in Example 31 equivalent to 2.6 parts of aluminum was added in increments at 5-minute intervals. After 4 hours of further stirring at 1° C., the catalyst was inactivated by adding 40 parts of a 1 M solution of ammonia in ethanol and then 40 parts of a 1% solution of 4,4′-thiobis(6-tert.-butyl-m-cresol) in ethanol was added as a stabilizer. The diluents were removed on a water bath under vacuum, and the crude copolymer which remained as a residue was extracted three times with hexane, whereby there was removed a small amount of low molecular weight oil. The hexane-insoluble polymer was a yellow, tough, rubbery polymer having an RSV of 12.0 (0.1% in chloroform at 25° C.). An infrared analysis of this copolymer indicated that it contained 13% vinyl allyl ether.

What we claim and desire to protect by Letters Patent is:

1. The process of polymerizing an ethylenically unsaturated ether selected from the group consisting of (1) ethers in which one valence of the ethereal oxygen is satisfied by a radical selected from the group consisting of vinyl, propenyl and isopropenyl radicals and the other valence of the ethereal oxygen is satisfied by a radical selected from the group consisting of alkyl, alkoxyalkyl, cyanoalkyl, fluoroalkyl, chloroalkyl, allyl, cycloalkyl, aralkyl, and aryl radicals, and (2) alkyl butadienyl ethers which comprises contacting at least one of said ethers at a temperature from about −100° to +200° C. with the catalyst formed by mixing a metal compound, with sulfuric acid, said metal compound having the general formula $$MO_xR_y(OR')_z$$

where M is a metal selected from groups III–A, IV–A, IV–B, V–B, VI–B and VIII of the periodic table, R is selected from the group consisting of hydrogen, alkyl, cycloalkyl, aralkyl and aryl, R′ is selected from the group consisting of alkyl, cycloalkyl, aralkyl, and aryl, $x$ is 0 to 2, and when $x$ is 0, the sum of $y$ and $z$ is equal to $n$, the valence of said metal, when $x$ is 1, the sum of $y$ and $z$ is equal to $(n-2)$, and when $x$ is 2, the sum of $y$ and $z$ is equal to $(n-4)$, the molar ratio of the sulfuric acid to the metal compound being from about 1:100 to about 2:1.

2. The process of claim 1 wherein the ethylenically unsaturated ether is a vinyl ether.

3. The process of claim 1 wherein the ethylenically unsaturated ether is a butadienyl ether.

4. The process of claim 1 wherein the ethylenically unsaturated ether is a propenyl ether.

5. The process of polymerizing a vinyl alkyl ether which comprises contacting the ether at a temperature from about $-100°$ to $+200°$ C. with the catalyst formed by mixing a group III–A metal alkoxide with sulfuric acid, the molar ratio of sulfuric acid to metal alkoxide being from about 1:100 to about 2:1.

6. The process of polymerizing a vinyl alkyl ether which comprises contacting the ether at a temperature from about $-100°$ to $+200°$ C. with the catalyst formed by mixing an aluminum alkoxide with sulfuric acid, the molar ratio of sulfuric acid to aluminum alkoxide being from about 1:100 to about 2:1.

7. The process of claim 6 wherein there is added as an activator for the polymerization a trialkylaluminum compound.

8. The process of claim 6 wherein there is added as an activator for the polymerization an aluminum alkoxide.

9. The process of polymerizing a vinyl alkyl ether which comprises contacting the ether at a temperature from about $-100°$ to $+200°$ C. with the catalyst formed by mixing a trialkylaluminum with sulfuric acid, the molar ratio of sulfuric acid to trialkylaluminum being from about 1:100 to about 2:1.

10. The process of claim 9 wherein there is added as an activator for the polymerization a trialkylaluminum compound.

11. The process of claim 9 wherein there is added as an activator for the polymerization an aluminum alkoxide.

12. The process of polymerizing a propenyl alkyl ether which comprises contacting the ether at a temperature from about $-100°$ to $+200°$ C. with the catalyst formed by mixing an aluminum alkoxide with sulfuric acid, the molar ratio of sulfuric acid to aluminum alkoxide being from about 1:100 to about 2:1.

13. The process of polymerizing vinyl methyl ether which comprises contacting the ether at a temperature from about $-100°$ to $+200°$ C. with the catalyst formed by mixing aluminum isopropoxide with sulfuric acid and as activator therefor triisobutylaluminum, the molar ratio of sulfuric acid to aluminum isopropoxide being from about 1:100 to about 2:1.

14. The process of polymerizing vinyl methyl ether which comprises contacting the ether at a temperature from about $-100°$ to $+200°$ C. with the catalyst formed by mixing aluminum isopropoxide with sulfuric acid and as activator therefor aluminum isopropoxide, the molar ratio of surfuric acid to aluminum isopropoxide being from about 1:100 to about 2:1.

15. The process of polymerizing vinyl methyl ether which comprises contacting the ether at a temperature from about $-100°$ to $+200°$ C. with the catalyst formed by mixing triethylaluminum with surfuric acid and as activator therefore aluminum triisopropoxide, the molar ratio of sulfuric acid to triethylaluminum being from about 1:100 to about 2:1.

References Cited in the file of this patent

UNITED STATES PATENTS 2,827,447     Nowlin et al. _____ Mar. 18, 1958

OTHER REFERENCES

Handbook of Chem. and Physics, 37th edition (1955–1956), pp. 392–393, Chem. Rubber Publish. Co.

Fundamental Chem., H. Deming, John Wiley & Sons, New York, N.Y., p. 752.

UNITED STATES PATENT OFFICE
CERTIFICATE OF CORRECTION

Patent No. 3,025,282          March 13, 1962

Donald L. Christman et al.

It is hereby certified that error appears in the above numbered patent requiring correction and that the said Letters Patent should read as corrected below.

Columns 7 and 8, Table III, Ex. 30, under the column headed "Parts", second occurrence, for "0.212" read -- 0.012 --; column 10, line 26, for "surfuric" read -- sulfuric --.

Signed and sealed this 10th day of July 1962.

(SEAL)
Attest:

ERNEST W. SWIDER
Attesting Officer

DAVID L. LADD
Commissioner of Patents